(12) United States Patent
Nagao (10) Patent No.: US 9,207,427 B2
(45) Date of Patent: Dec. 8, 2015

(54) OPTICAL APPARATUS

(71) Applicant: CANON KABUSHIKI KAISHA, Tokyo (JP)

(72) Inventor: Yuki Nagao, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/446,765

(22) Filed: Jul. 30, 2014

(65) Prior Publication Data

US 2015/0036039 A1 Feb. 5, 2015

(30) Foreign Application Priority Data

Aug. 1, 2013 (JP) ................................. 2013-160144

(51) Int. Cl.
*G02B 7/10* (2006.01)
*H04N 5/232* (2006.01)

(52) U.S. Cl.
CPC .............. *G02B 7/10* (2013.01); *H04N 5/23296* (2013.01)

(58) Field of Classification Search
CPC .............................. H04N 5/23209; G02B 7/10
USPC ......................................... 348/360, 361, 335
See application file for complete search history.

(56) References Cited

U.S. PATENT DOCUMENTS

2010/0208122 A1* 8/2010 Yumiki .................... 348/333.08
2010/0253826 A1* 10/2010 Green et al. ................. 348/335

FOREIGN PATENT DOCUMENTS

| JP | 60-241006 A | 11/1985 |
| JP | 07-049456 Y2 | 10/1989 |
| JP | 2013-037303 A | 2/2013 |

* cited by examiner

*Primary Examiner* — Tuan Ho (74) *Attorney, Agent, or Firm* — Rossi, Kimms & McDowell LLP (57) ABSTRACT

An optical apparatus includes an operator rotationally operable about an optical axis of an image pickup optical system and configured to move, when rotationally operated, part of the image pickup optical system in an optical axis direction of the image pickup optical system and to change a focal length, an adjustor rotationally operable about the optical axis and configured to change, when rotationally operated, a pressure applied to the operator so as to change an operating load necessary to rotationally operate the operator, and an indicator prohibited from rotating about the optical axis and configured to move in the optical axis direction of the image pickup optical system, the indicator including part disposed between the operator and the adjustor. The operator indicates a plurality of zoom states, the part of the indicator has a pointer configured to select one of the plurality of zoom states.

13 Claims, 5 Drawing Sheets

OPTICAL APPARATUS

BACKGROUND OF THE INVENTION

1. Field of the Invention

The present invention relates to an optical apparatus, such as a lens barrel attachable to a camera body, and a lens-integrated camera.

2. Description of the Related Art

A zoom lens may cause unexpected zooming in upward or downward capturing and change a composition due to its own weight, when a lens unit configured to move in zooming is heavy or has a large moving amount. When a zoom lens configured to change its overall length in zooming is carried, the zoom lens may cause unexpected zooming, a lens barrel may extend to an object side, and the zoom lens may break. Accordingly, Japanese Patent Laid-Open No. ("JP") 60-241006 includes an adjusting ring configured to adjust a zooming load and arranged next to a zooming ring, an elastic member held between the zooming ring and the adjusting ring, and makes the zooming load variable by changing a force applied by the elastic member to the zooming ring when the adjusting ring is rotated. Japanese Utility-Model Publication No. ("JU") 7-49456 engages a forcing unit with a cam groove in an inner circumference of an adjusting ring and makes the zooming load variable by changing the force of the forcing unit applied to a cam cylinder when the adjusting ring is rotated.

A conventional method indicates a zoom state of a zoom lens by a scale printed on the zooming ring and a pointer printed on a non-rotatable member arranged next to the zooming ring. However, in JP 60-241006, the neighboring zooming ring and adjusting ring rotate together and thus cannot use this method. A second embodiment of JU 7-49456 (directed to the zoom lens barrel illustrated in FIG. 5 of the reference), for example, arranges a fixed member (fixed barrel 52) between the cam cylinder (magnification-varying ring 50 connected to the cam cylinder 51) and the adjusting ring (zooming ring 7) and thus can indicate a zoom state (a variable-magnification state) using the above method (in which the scale is printed on the zooming ring and the pointer is printed on the non-rotatable member next to the zooming ring). Nevertheless, a zoom lens barrel illustrated in FIG. 5 of this reference requires a space for the forcing member (wave spring 10) on an end surface of the cam cylinder in an optical axis direction, and the entire product becomes long. In general, the cam cylinder is longer than the zooming ring in the optical axis direction. When the forcing member is provided on the end surface of the cam cylinder in the optical axis direction, the entire product becomes longer in the optical axis direction by the length of the forcing member. Moreover, it is necessary to locate the cam cylinder near an outer surface of the product.

SUMMARY OF THE INVENTION

The present invention provides a compact optical apparatus capable of adjusting a zooming load and of indicating a zoom state.

An optical apparatus according to the present invention includes an image pickup optical system configured to form an optical image of an object, an operator rotationally operable about an optical axis of the image pickup optical system and configured to move, when rotationally operated, part of the image pickup optical system in an optical axis direction of the image pickup optical system and to change a focal length, an adjustor rotationally operable about the optical axis and configured to change, when rotationally operated, a pressure applied to the operator so as to change an operating load necessary to rotationally operate the operator, and an indicator prohibited from rotating about the optical axis and configured to move in the optical axis direction of the image pickup optical system, the indicator including part disposed between the operator and the adjustor. The operator indicates a plurality of zoom states, the part of the indicator has a pointer configured to select one of the plurality of zoom states.

Further features of the present invention will become apparent from the following description of an exemplary embodiment with reference to the attached drawings.

DESCRIPTION OF THE EMBODIMENTS

Figure 1A:
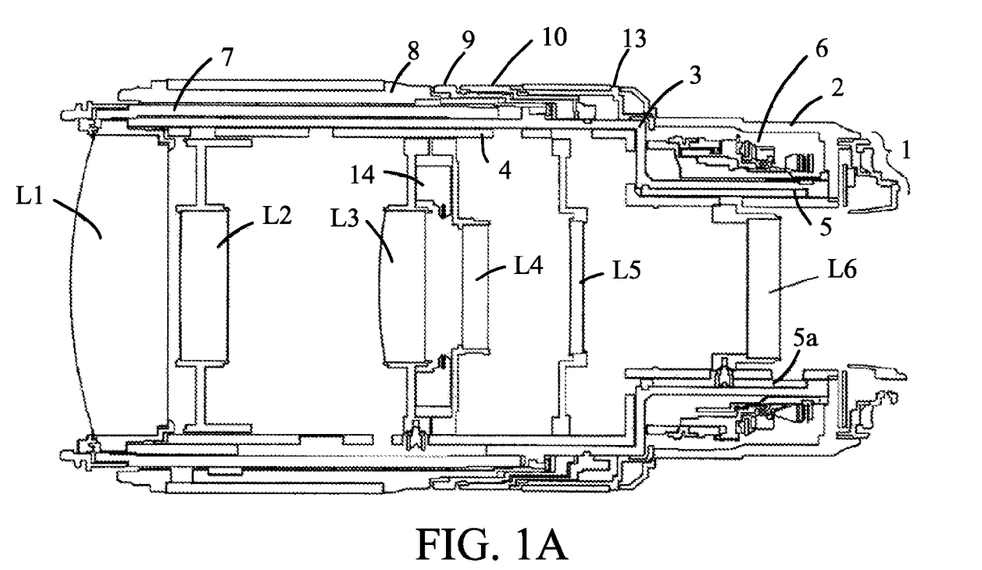
FIGS. 1A and 1B are a sectional view and a partially enlarged view of a lens barrel according to this embodiment.
Figure 1B:
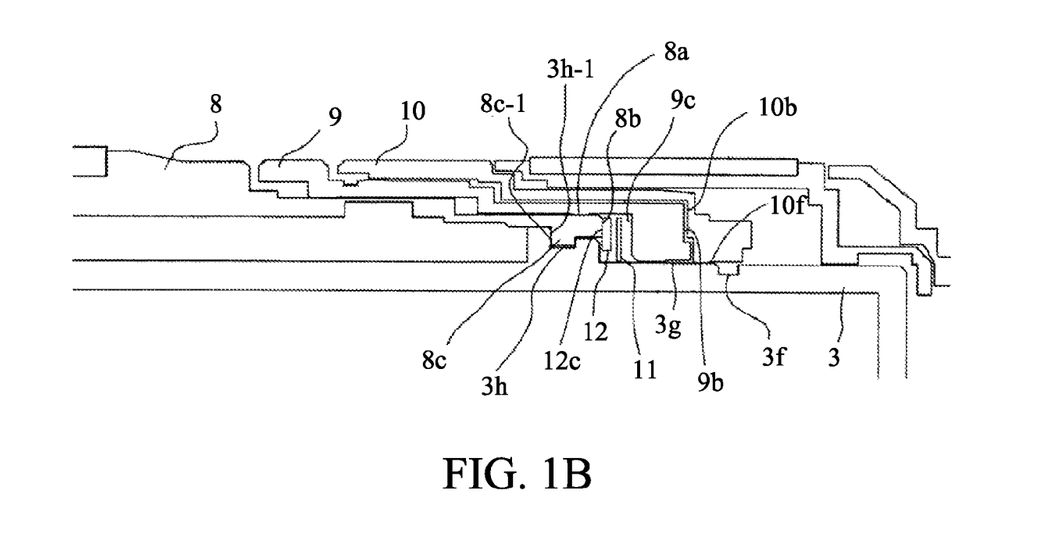
Figure 2:
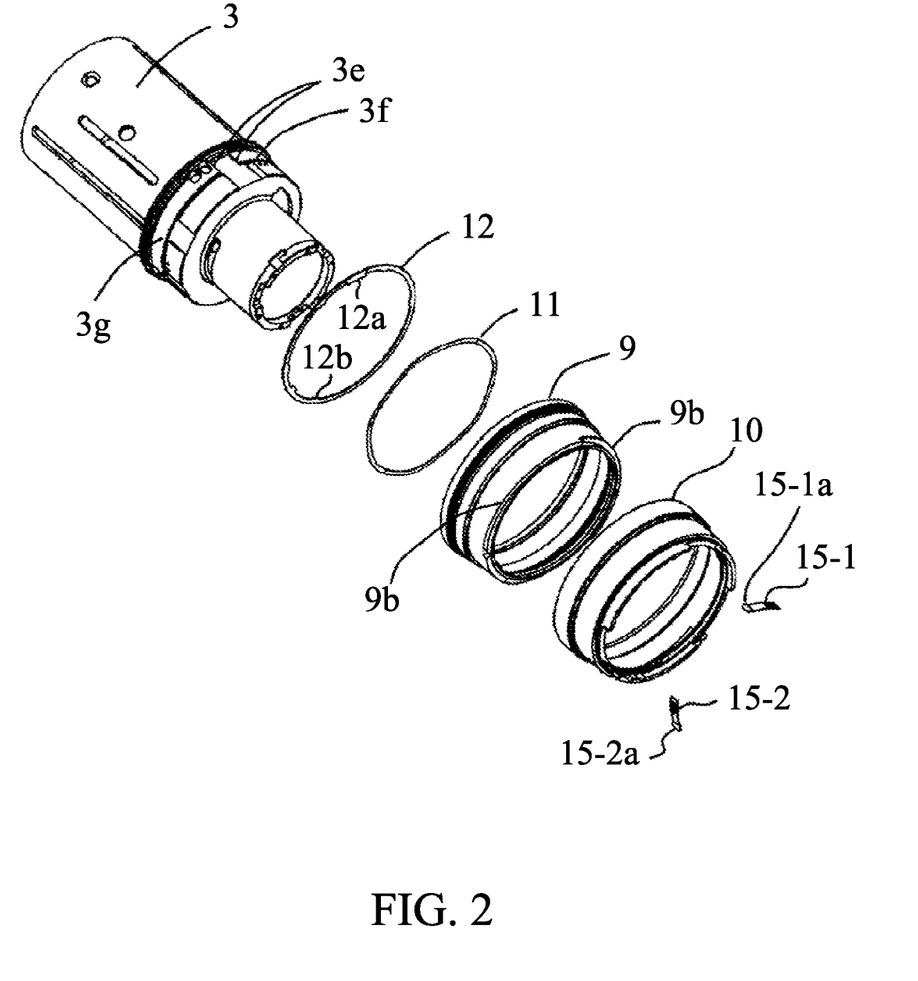
FIG. 2 is an exploded perspective view of the lens barrel illustrated in FIGS. 1A and 1B.
Figure 3:
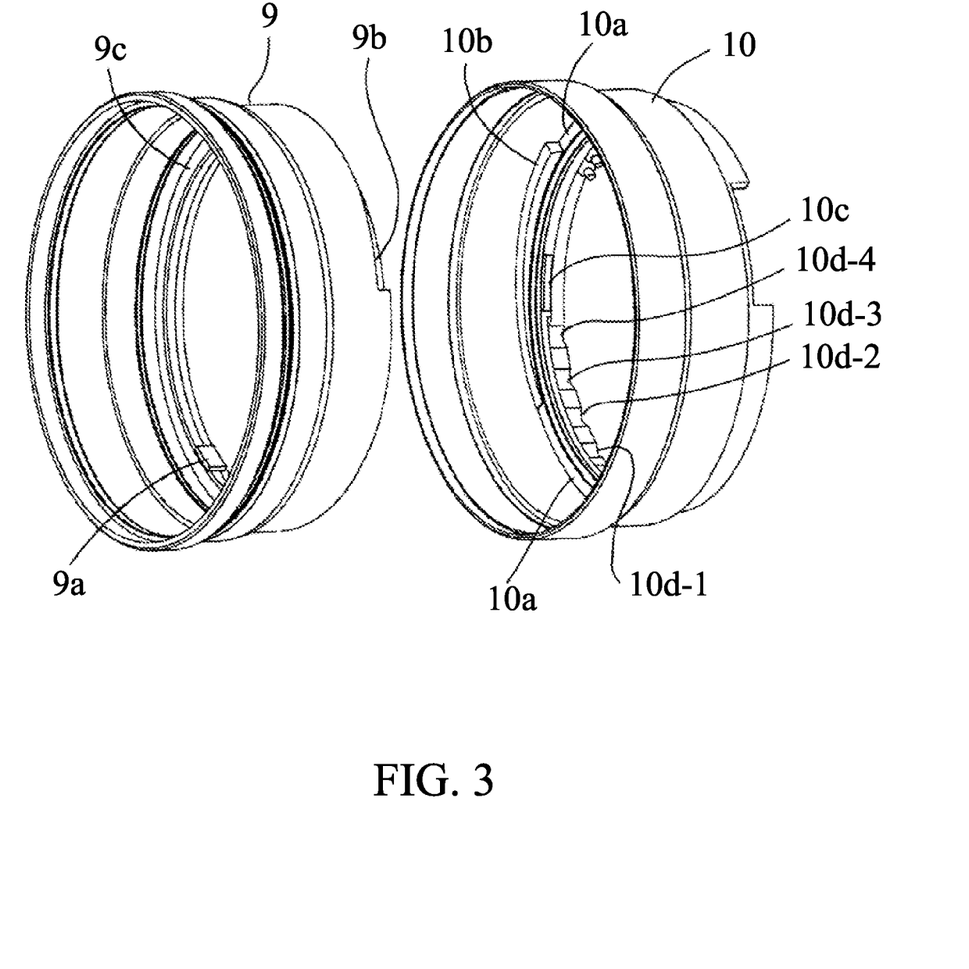
FIG. 3 is an exploded perspective view of an advancing-retreating ring and a force adjusting ring of the lens barrel illustrated in FIGS. 1A and 1B.
Figure 4A:
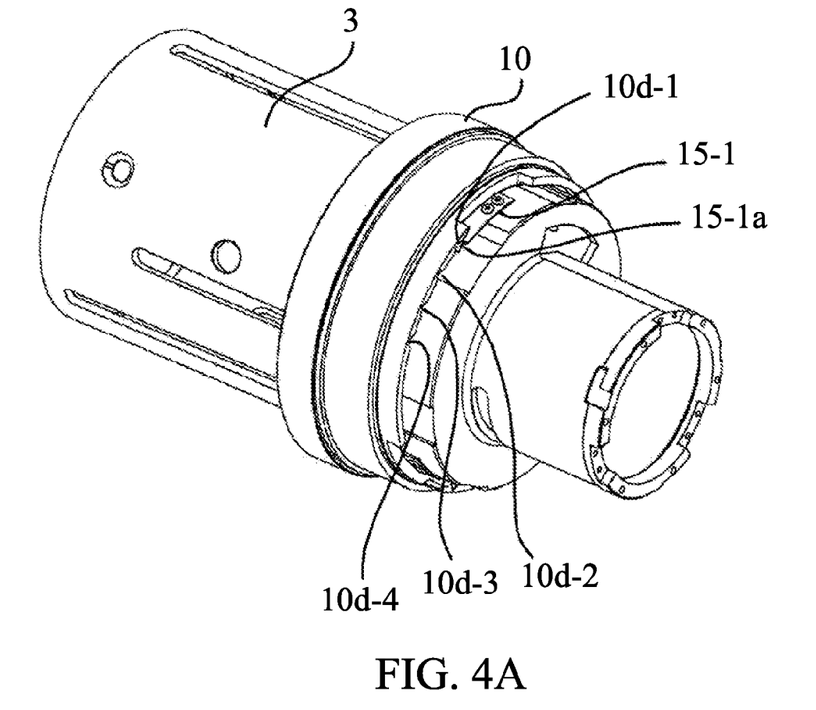
FIGS. 4A and 4B are perspective views of part of the lens barrel illustrated in FIGS. 1A and 1B.
Figure 4B:
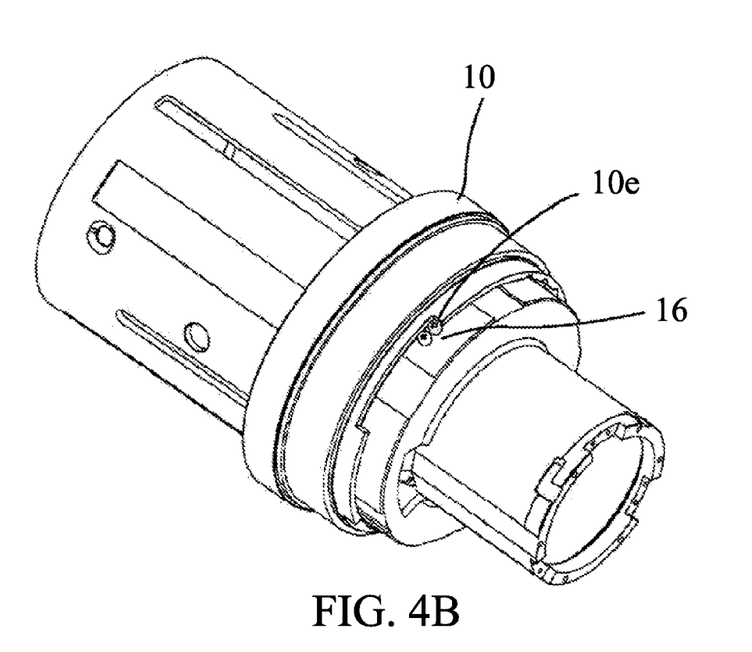
Figure 5:
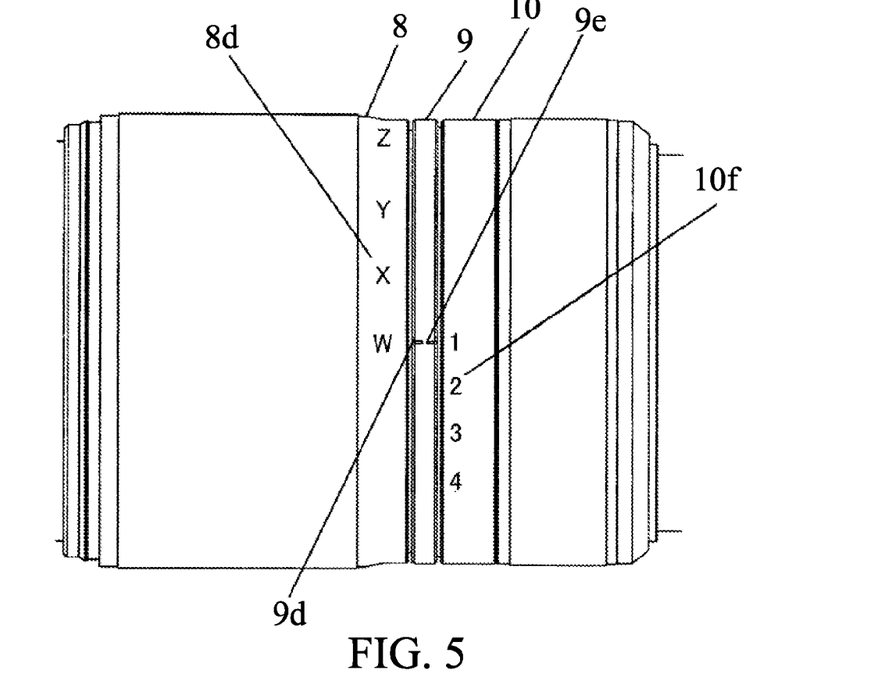
FIG. 5 is a partially enlarged side view of the lens barrel illustrated in FIGS. 1A and 1B.
Figure 6:
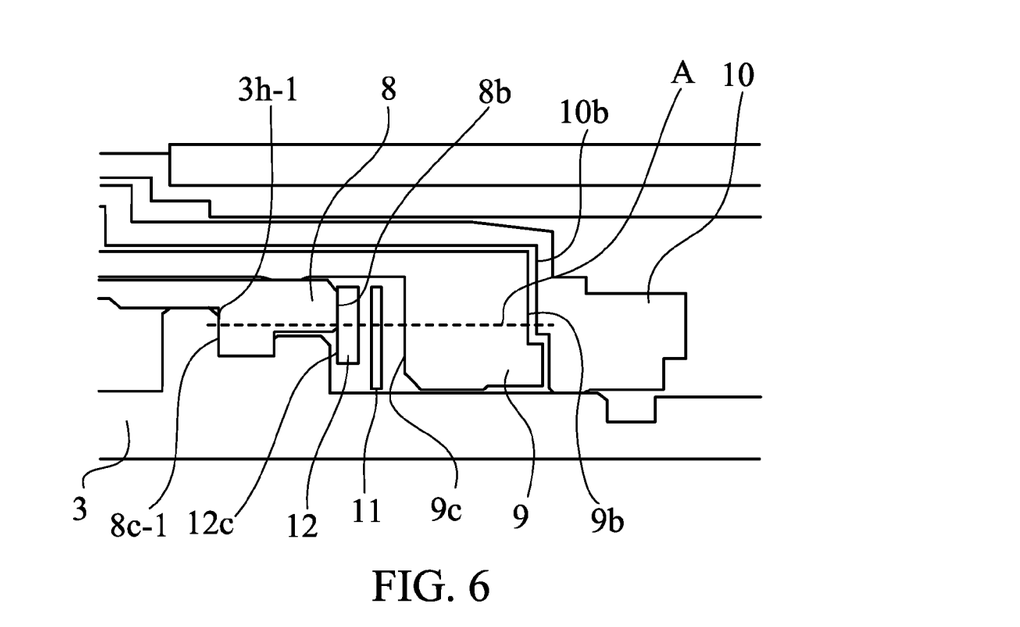
FIG. 6 is a partially enlarged sectional view of the lens barrel illustrated in FIGS. 1A and 1B.

FIG. 1A is a sectional view of a lens barrel (optical apparatus) according to this embodiment, and FIG. 1B is a partially enlarged sectional view of the lens barrel illustrated in FIG. 1A. FIG. 2 is an exploded perspective view of the lens barrel. FIG. 3 is an exploded perspective view of an advancing-retreating ring 9 and a force adjusting ring 10. FIGS. 4A and 4B are perspective view of part of the lens barrel. FIG. 5 is a partially enlarged side view of the lens barrel. FIG. 6 is a partially enlarged sectional view of the lens barrel according to this embodiment. The optical apparatus according to the present invention may be a lens-integrated camera.

The lens barrel includes an image pickup optical system that has six lens units L1 to L6, and forms an optical image of an object. The image pickup optical system is a variable-magnification optical system having a magnification-varying function configured to change a focal length. In focusing, the lens unit L6 serves as a focus lens configured to move in an optical axis direction for focusing. In zooming, the lens units L1, L3, L4, and L6 move in the optical axis direction for zooming. The zoom lens includes move two or more (three in this embodiment) lens units movable in the optical axis direction, thus is usually heavy, and is likely to cause a zooming shift due to its own weight.

Fixed units of the lens barrel are a mount 1 attached to a camera body, a fixed cylinder 2 as a cover, and a guide cylinder 3 configured to hold a lens holding frame. The guide cylinder 3 is a fixed member having three linear grooves arranged at regular intervals in a circumferential direction hold the movable lens units L1, L3, and L4 and to guide them in the optical axis direction.

Reference numeral 4 denotes a cam cylinder having three cam grooves arranged at regular intervals in a circumferential direction, and defines trajectories of the movable lens units L1, L3, L4, and L6, which are at least part of the image pickup optical system. The fixed lens units L2 and L5 are disposed on an inner circumference of the cam cylinder 4, and fixed onto the guide cylinder 3 by collar members provided on each of the fixed lens units L2 and L5.

A holding cylinder 7 configured to hold the lens unit L1 is disposed on an outer circumference of the guide cylinder 3. Collar members provided on the holding cylinder 7 are engaged with the linear grooves of the guide cylinder 3 and the cam grooves of the cam cylinder 4, and the holding cylinder 7 is thus held onto the guide cylinder 3 movably in the optical axis direction but non-rotatably around the optical axis.

The lens units L3 and L4 are disposed on the inner circumference of the cam cylinder 4. Collar members provided on each of the lens units L3 and L4 are engaged with the linear grooves of the guide cylinder 3 and the cam grooves of the cam cylinder 4, and the lens units L3 and L4 are thus held onto the guide cylinder 3 movably in the optical axis direction and non-rotatably around the optical axis.

Reference numeral 5 denotes a focus rotating cylinder having three linear grooves arranged at regular intervals in a circumferential direction. Reference numeral 6 denotes a focus motor unit, and its output key (not illustrated) is engaged with part of the focus rotating cylinder 5. Collar members provided on the movable lens unit L6 are engaged with the corresponding linear groove of the focus rotating cylinder 5 and the corresponding cam groove of the cam cylinder 4.

Because of the above configuration, when a rotating force is applied by the focus motor unit 6 to the focus rotating cylinder 5, the movable lens unit L6 moves back and forth in the optical axis direction.

A zooming ring 8 is engaged with the guide cylinder 3 through its circumference, is bayonet-connected with a bayonet claw 8c and a circumferential groove 3h of the guide cylinder 3. Thus, a position of the zooming ring in the optical axis direction is restricted, and is held by the guide cylinder 3 rotatably about the optical axis of the image pickup optical system by a predetermined amount. The zooming ring 8 is coupled with the cam cylinder 4 by a coupling key (not illustrated). When the zooming ring 8 is rotated, the cam cylinder 4 rotates by the same amount, moves part of the image pickup optical system (the lens units L3 and L4) in the optical axis direction, and changes a focal length. The zooming ring 8 is an operator rotationally operable by a user in the zooming, and does not have to be a perfect ring as in this embodiment. Part of the zooming ring 8 is inserted into the advancing-retreating ring 9.

The advancing-retreating ring 9 (indicator) has an inner circumference is engaged with an outer circumference 8a of the zooming ring 8, and a protrusion 9a on its inner circumference which is engaged with a linear groove 3e of the guide cylinder 3 so as to restrict a rotation of the advancing-retreating ring 9 about the optical axis. Thus, the advancing-retreating ring 9 is held movably back and forth only in the optical axis direction. Formed on part of a mount-side surface of the advancing-retreating ring 9 orthogonal to the optical axis, three bevels 9b in the circumferential direction as illustrated in FIG. 3 as oblique surfaces whose height in the optical axis direction changes gradually and continuously. The advancing-retreating ring 9 is prohibited from rotating around the optical axis and configured to move in the optical axis direction in this embodiment. The advancing-retreating ring 9 does not have to be a perfect ring as in this embodiment. Part of the advancing-retreating ring 9 is inserted into a force adjusting ring 10.

The force adjusting ring 10 is an adjuster configured to, when rotationally operated, change a pressure applied to the zooming ring 8 and to change an operating load of the zooming ring 8. The force adjusting ring 10 has an inner circumference 10f engaged with an outer circumference 3g of the guide cylinder 3, and is bayonet-connected with a circumferential groove 3f of the guide cylinder 3 through its (three, for example) protrusions 10c such that its position in the optical axis direction is restricted and the force adjusting ring 10 is held rotatable about the optical axis by a predetermined amount. Bevels 10b illustrated in FIG. 3 are formed on part of a surface 10a of the force adjusting ring 10 orthogonal to the optical axis. Three bevels 10b are formed in a circumferential direction as oblique surfaces whose height in the optical axis direction changes gradually and continuously in a rotation direction about the optical axis with respect to the surface 10a. The bevels 10b abut on the bevels 9b.

As illustrated in FIGS. 2 and 4A, click springs 15 (15-1 and 15-2) as compression springs are screwed on the outer circumference of the guide cylinder 3 and a tip 15-1a of the click spring 15-1 is engaged with a concave 10d-1 of the force adjusting ring 10 (state 1). In this configuration, when the force adjusting ring 10 is rotated clockwise as seen from the mount side, the tip 15a comes off from the concave 10d-1 and becomes engaged with a concave 10d-2 (state 2). When the force adjusting ring 10 is further rotated, the tip 15a comes off from the concave 10d-2, becomes engaged with a concave 10d-3 (state 3), and finally with a concave 10d-4 (state 4).

The click springs 15 may be fixed onto one of the guide cylinder 3 and the force adjusting ring 10. The plurality of concaves may be provided to the other of the guide cylinder 3 and the force adjusting ring 10, and engaged with the click springs 15 such that the click springs 15 applies a force to the concaves. As a consequence, when the force adjusting ring 10 is rotationally operated, the click springs 15 give the user a click sense when the click spring 15 is engaged with each concave.

This embodiment provides the click springs 15 at two locations with different phases, and two sets of concaves 10d-1 to 10d-4 of the force adjusting ring 10 associated with the click springs 15. The number of the click springs 15 may be one, or three or more as long as the number of sets of corresponding concaves 10d-1 to 10d-4 of the force adjusting ring 10 is adjusted. This configuration enables the click springs 15 to give the user the click sense when the force adjusting ring 10 is rotated and the force adjusting ring 10 to be stably held at each rotary position.

As illustrated in FIG. 4B, a rotating amount of the force adjusting ring 10 is restricted within a predetermined angular range by screws 16 fixed onto the guide cylinder 3 and by a cutout 10e of the force adjusting ring 10. This rotational restriction allows the force adjusting ring 10 to rotate beyond the range that covers the states 1 to 4, which are adjustment states of the force adjusting ring 10.

Provided between a rear or end surface 8b of the zooming ring 8 and a surface 9c orthogonal to the optical axis of the advancing-retreating ring 9 are a wave washer 11 and an annular ring 12 configured to stably transfer a force generated by the wave washer 11 to the zooming ring 8.

The wave washer 11 is an elastic member configured to apply a force (pressure) in the optical axis direction to the annular ring 12, and may be replaced with another elastic member such as rubber. While the wave washer 11 is disposed between the zooming ring 8 and the advancing-retreating ring 9 in this embodiment, it may alternatively be disposed between the advancing-retreating ring 9 and the force adjusting ring 10. In the latter case, the force adjusting ring 10 is helicoidally connected to the guide cylinder 3. Since this embodiment provides the zooming ring 8, the advancing-retreating ring 9, and the force adjusting ring 10 around the cam cylinder 4 such that the pressure generated by the wave washer 11 extends to the zooming ring 8 rather than the cam cylinder 4, the lens barrel according to this embodiment can be made smaller than that disclosed in JU7-49456. The lens barrel according to the present invention may have a friction clutch having no wave washer 11, as long as the pressure applied to the zooming ring 8 may be varied when the force adjusting ring 10 is rotationally operated.

The annular ring 12 has an inner circumference 12b engaged with the circumference 3g of the guide cylinder 3, and a protrusion 12a provided on its inner circumference which is engaged with the linear groove 3e of the guide cylinder 3 such that its rotation about the optical axis is restricted and the annular ring 12 is held movably back and forth in the optical axis direction. Due to a force (pressure) applied by the wave washer 11 to push the annular ring 12 in a forward direction, a front surface 12c of the annular ring 12 always adheres closely to the rear surface 8b of the zooming ring 8.

A focusing ring 13 is engaged with the guide cylinder 3 through its circumference, is bayonet-connected in the optical axis direction such that its position in the optical axis direction is restricted and the focusing ring 13 is held rotatably about the optical axis. An end of the focusing ring 13 is engaged with part of the focus motor unit 6 for manual focusing operations.

A description will now be given of a method of adjusting a zooming load.

The wave washer 11 is assembled after it is held between the annular ring 12 and the advancing-retreating ring 9, and thus the wave washer 11 is always compressed. In other words, a force pressing the advancing-retreating ring 9 to the mount side is always applied, and causes the bevels 9b of the advancing-retreating ring 9 and the bevels 10b of the force adjusting ring 10 to always adhere closely to the rear surface 8b of the zooming ring 8.

In the state 1 of a rotational position of the force adjusting ring 10, the bevels 9b of the advancing-retreating ring 9 and the bevels 10b of the force adjusting ring 10 become closest to each other in the optical axis direction because of their contact positions in a circumferential direction. In other words, the advancing-retreating ring 9 is located closest to the mount side and thus a compression amount of the wave washer 11 held between the annular ring 12 and the advancing-retreating ring 9 is minimum.

As the rotational angle position of the force adjusting ring 10 sequentially changes from the state 2 to the state 3 and then to the state 4, the advancing-retreating ring 9 moves away from the force adjusting ring 10 in the optical axis direction and the compression amount of the wave washer 11 increases.

When the compression amount of the wave washer 11 increases, a force applied by the wave washer 11 to press the annular ring 12 to the lens front side increases and a force applied by the front surface 12c of the annular ring 12 to press the rear surface 8b of the zooming ring 8 increases.

Depending upon the force applied by the front surface 12c of the annular ring 12 to press the rear surface 8b of the zooming ring 8, a frictional force between the rear surface 8b and the front surface 12c and a frictional force between the bayonet surface 8c-1 and the surface 3h-1 of the guide cylinder 3 change and an operating load necessary to rotate the zooming ring 8 changes.

While this embodiment moves, when the force adjusting ring 10 is rotationally operated around the optical axis, the advancing-retreating ring 9 in the optical axis direction and changes its relative position to the zooming ring 8, both of the force adjusting ring 10 and the advancing-retreating ring 9 may be moved in the optical axis direction so as to change their relative positions to the zooming ring 8. In the latter case, the force adjusting ring 10 is helicoidally connected to the guide cylinder 3.

FIG. 5 is a partially enlarged side view of the lens barrel, and illustrates scales 8d of the zooming ring 8, pointers 9d and 9e of the advancing-retreating ring 9, and scales 10d of the force adjusting ring 10. The scales 8d of the zooming ring 8 indicate a plurality of (four in this embodiment or W, X, Y, and X) variable-magnification states (zoom states), each of which indicates focal length information printed on the zooming ring 8. The pointer 9d of the advancing-retreating ring 9 is an index configured to select one of the plurality of variable-magnification states. The scale 8d selected by the pointer 9d indicates a current focal length state. The focal length is the state W in FIG. 5. The scales 10f of the force adjusting ring 10 indicate a plurality of (four or 1, 2, 3, and 4 in this embodiment) zooming load states. The larger the numeral is, a larger zooming load is. The pointer 9e of the advancing-retreating ring 9 is an index configured to select one of the plurality of zooming load states. The scale 10f selected by the pointer 9e indicates a current zooming load. The force corresponding to the state 1 is selected in FIG. 5.

Since the moving direction of the advancing-retreating ring 9 is restricted to the optical axis direction as the force adjusting ring 10 is located at any of the positions corresponding to the states 1 to 4, the pointer 9d can always correctly indicate a focal length state of the zooming ring 8.

The operating load of the zooming ring 8 can be made light when the force adjusting ring 10 has the state 1 and made heavier as the force adjusting ring 10 turns to the state 2, then the state 3, and finally the state 4. The advancing-retreating ring 9 provided between the zooming ring 8 and the force adjusting ring 10 can indicate the zoom scales printed on the zooming ring 8 through its pointers.

As illustrated in FIG. 6, part of each of the surface 3h-1, bayonet surface 8c-1, rear surface 8b, front surface 12c of the annular ring 12, wave washer 11, circumferential surface 9c, bevel 9b, and bevel 10c is distant from the optical axis by the same distance. A force is transferred on a surface including a dashed line A in FIG. 6. Thereby, when the force adjusting ring 10 is rotationally operated, a moving force received by the advancing-retreating ring 9, a force applied by the advancing-retreating ring 9 to press the wave washer 11, a force applied by the advancing-retreating ring 9 to press the zooming ring 8 via the annular ring 12, and a pressing force applied by the zooming ring 8 to the surface 3h-1 become parallel to the optical axis. Hence, each component is effectively prevented from being deformed by the pressure, and the force is likely to transfer among each component in parallel to the optical axis. Thus, a stick-slip is less likely to occur when the zooming ring 8 is operated.

While this embodiment sets four positions (i.e., the states 1 to 4) to provide the click sense when the force adjusting ring 10 is rotated, the number of positions is not limited to four. For instance, the click sense may be set only at the position (corresponding to the state 1) at which the operating load is minimum and the position (corresponding to the state 4) at which the operating load is maximum. In this case, a proper operating load of the zooming ring 8 may be applied by locating the force adjusting ring 10 at an arbitrary rotational position in the non-clicking area.

This embodiment illustrates that the wave washer 11 is compressed even when the advancing-retreating ring 9 is located closest to the mount side (the state 1). Alternatively, a zooming load can be made weaker by setting a clearance at which the wave washer 11 is located in the state 1 (which is a space formed by the annular ring 12 and the advancing-retreating ring 9 in the optical axis direction) equal to the natural thickness of the wave washer 11 such that the wave washer 11 is not compressed.

While this embodiment divides the pointers of the advancing-retreating ring 9 into the pointers 9c and 9d, it is unnecessary to divide the pointers into two and one common pointer may be used. The pointer may not be limited to a line and an arrow or another index may be used.

According to this embodiment, the force adjusting ring 10 rotates at a constant position without changing its position in the optical axis direction, the end surface cam changes an interval between the force adjusting ring 10 and the advancing-retreating ring 9 and a compression amount of the wave washer 11. Alternatively, the present invention may bring the force adjusting ring 10 and the advancing-retreating ring 9 into plane contact and allows the force adjusting ring 10 to rotate and draw out relative to the guide cylinder 3. In that case, the force adjusting ring 10 moves in the optical axis direction integrally with the advancing-retreating ring 9. An effect similar to that of this embodiment can be achieved even when the advancing-retreating ring 9 is moved to change a compression amount of the wave washer 11.

According to the advancing-retreating mechanism of the advancing-retreating ring 9 of this embodiment, the bevels 9b provided on the advancing-retreating ring 9 and the bevels 10b provided on the force adjusting ring 10 contact each other, but one of them is not necessarily required for a bevel when the other has a bevel. For instance, the one may have a spherical or semi-cylindrical protruding shape. The spherical protrusion may point-contact the bevel of the other side and the arc protrusion may line-contact the bevel of the other side. The structure may depend upon the compression force of the wave washer 11 in such a manner that when the compression force is large, the contact area is increased, and when the compression force is small, the contact area is reduced.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2013-160144, filed on Aug. 1, 2013, which is hereby incorporated by reference herein in its entirety.

What is claimed is:

1. An optical apparatus comprising:
   an image pickup optical system configured to form an optical image of an object;
   an operator rotationally operable about an optical axis of the image pickup optical system and configured to move, when rotationally operated, part of the image pickup optical system in an optical axis direction of the image pickup optical system and to change a focal length;
   an adjustor rotationally operable about the optical axis and configured to change, when rotationally operated, a pressure applied to the operator so as to change an operating load necessary to rotationally operate the operator; and
   an indicator prohibited from rotating about the optical axis and configured to move in the optical axis direction of the image pickup optical system, the indicator including part disposed between the operator and the adjustor,
   wherein the operator indicates a plurality of zoom states, the part of the indicator has a pointer configured to select one of the plurality of zoom states.

2. The optical apparatus according to claim 1, further comprising an elastic member provided between the operator and the indicator or between the indicator and the adjustor, and configured to apply the pressure, wherein when the adjustor is rotationally operated about the optical axis, the pressure applied by the elastic member to the operator changes.

3. The optical apparatus according to claim 1, wherein when the adjustor is rotationally operated about the optical axis, the indicator moves or both the indicator and the adjustor move in the optical axis direction to change a relative position to the operator.

4. The optical apparatus according to claim 1, further comprising:
   a fixer configured to at least partially hold the image pickup optical system and engaged with the operator;
   a compression spring fixed onto one of the fixer and the adjustor; and
   a plurality of concaves provided to the other of the fixer and the adjustor and engaged with the compression spring, the concaves receiving a force from the compression spring,
   wherein the compression spring provides a click sense when the compression spring is engaged with the concave when the adjustor is rotationally operated.

5. The optical apparatus according to claim 1, wherein one of the adjustor and the indicator has a bevel and the other of the adjustor and the indicator has one of a point and a surface which contacts the bevel, wherein an interval between the adjustor and the indicator changes when the adjustor is rotationally operated.

6. The optical apparatus according to claim 1, wherein the pressure is parallel to the optical axis.

7. The optical apparatus according to claim 1, wherein the adjustor indicates a plurality of operating load states, and the part of the indicator has a pointer configured to select one of the plurality of operating load states.

8. The optical apparatus according to claim 2, wherein the elastic member is a wave washer.

9. The optical apparatus according to claim 1, further comprising a cam cylinder configured to hold the part of the image pickup optical system, coupled to the operator, and configured to rotate when the operator is rotationally operated, wherein the operator, the indicator, and the adjustor are provided around the cam cylinder.

10. The optical apparatus according to claim 1, wherein part of the indicator is inserted into the adjustor, and part of the operator is inserted into the indicator.

11. The optical apparatus according to claim 1, further comprising an annular ring configured to receive the pressure and transfer the pressure to the operator.

12. The optical apparatus according to claim 1, wherein the optical apparatus is a lens barrel attachable to a camera body that includes an image sensor configured to photoelectrically convert the optical image formed by the image pickup optical system.

13. An image pickup optical apparatus comprising:
   an optical apparatus that includes an image pickup optical system configured to form an optical image of an object; and
   a camera body that includes an image sensor configured to photoelectrically convert the optical image formed by the image pickup optical system
   wherein the optical apparatus further includes:

an operator rotationally operable about an optical axis of the image pickup optical system and configured to move, when rotationally operated, part of the image pickup optical system in an optical axis direction of the image pickup optical system and to change a focal length;

an adjustor rotationally operable about the optical axis and configured to change, when rotationally operated, a pressure applied to the operator so as to change an operating load necessary to rotationally operate the operator; and an indicator prohibited from rotating about the optical axis and configured to move in the optical axis direction of the image pickup optical system, the indicator including part disposed between the operator and the adjustor, wherein the operator indicates a plurality of zoom states, the part of the indicator has a pointer configured to select one of the plurality of zoom states.

* * * * *